United States Patent [19]
Johnson

[11] Patent Number: 5,835,571
[45] Date of Patent: Nov. 10, 1998

[54] AUTOMATED TELEPHONE SERVICE INTERFACE

[75] Inventor: William J. Johnson, Flower Mound, Tex.

[73] Assignee: MCI Communications Corporation, Washington, D.C.

[21] Appl. No.: 721,408

[22] Filed: Sep. 26, 1996

Related U.S. Application Data

[63] Continuation-in-part of Ser. No. 673,813, Jun. 27, 1996.
[51] Int. Cl.[6] ...................................................... H04M 3/42
[52] U.S. Cl. .............................. 379/67; 379/88; 379/354; 379/93.08; 379/93.26
[58] Field of Search .................................. 379/67, 68, 88, 379/89, 354, 355, 356, 93.08, 93.26

[56] References Cited

U.S. PATENT DOCUMENTS

| | | | |
|---|---|---|---|
| 4,783,800 | 11/1988 | Levine | 379/67 |
| 5,029,197 | 7/1991 | Hashimoto | 379/88 |
| 5,343,519 | 8/1994 | Feldman | 379/355 |
| 5,592,538 | 1/1997 | Kosokowsky | 379/93.08 |
| 5,596,636 | 1/1997 | Davies et al. | 379/355 |

Primary Examiner—Daniel S. Hunter

[57] ABSTRACT

A system and method for automatically interfacing a telephone user to an automated telephone service. The system allows a user to record interfacing to an automated telephone service and save the recording for later recall. The recording can be saved to personal local storage or to a shared storage area for use by a plurality of users. The system allows a user to invoke the saved recording of interface activity at any time so that the automated telephone service is interfaced to in an automatic manner. The system monitors for the press of telephone buttons (such as DTMF signals). The system determines whether a telephone button has been pressed or a command has been entered. If a telephone button has been pressed and record mode is set to ON, the system records a macro which can subsequently be used to automatically navigate within an automated service. A macro is recorded by saving a button type that is determined by the duration of the telephone button pressed, the button, and the time since press of the previous entry. The two types of buttons that allow interfacing to an automated service are immediate and wait. Commands are entered for governing system operation. Commands include saving a macro to a local library; invoking a macro by button or by voice; browsing a macro library; and deleting a macro. When the desired macro is recorded, the user can save the macro with a desired invocation sequence, thereby allowing invoking the macro by voice or with buttons. The system uses information stored in the macro to coordinate delivering DTMF signals in an appropriate and proper manner to an automated telephone service.

30 Claims, 13 Drawing Sheets

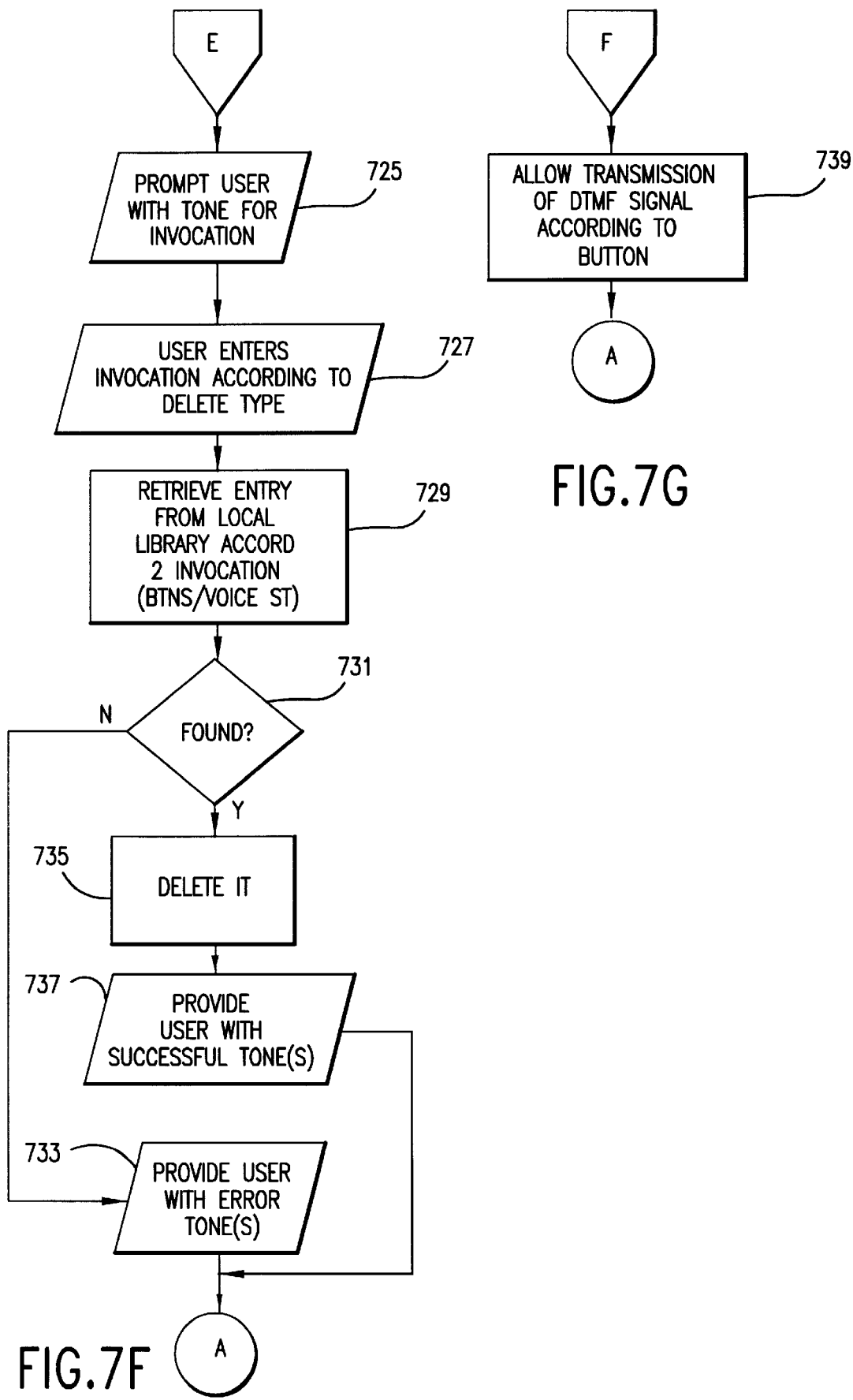

AUTOMATED TELEPHONE SERVICE INTERFACE

CROSS-REFERENCE TO OTHER APPLICATION

The following applications are related to the present application. "System and Method for Transmitting Data and Commands Using a Telephone," Ser. No. 08/672,186, filed Jun. 27, 1996, incorporated herein by reference; and a continuation-in-part of "Wireless Smart Phone," Ser. No. 08/673,813, filed Jun. 27, 1996, incorporated herein by reference.

BACKGROUND OF THE INVENTION

1. Field of the Invention

The present invention relates generally to telecommunications, and more particularly to a system and method for automatically interfacing a user to an automated telephone service using Dual Tone Multiple Frequency (DTMF) macros.

2. Related Art

Automated telephone services allow users to interface to menus for selecting the service path which best meets a user's needs. Such services include, but are not limited to, banking, shopping, marketing, polls, games, and stock market. For example, a 1-800-MUSIC-NOW service allows a user to traverse menus in order to sample music and place orders.

These automated interactive telecommunication service systems provide Dual Tone Multiple Frequency (DTMF) menus for which a user navigates by pressing telephone buttons for options and selections. Typically, a user dials a telephone number associated with a desired service. A telephone connection is established between the user and a computer. The user interacts with the computer via the telephone to obtain the services provided by the computer, and desired by the user. The computer typically includes some type of audio unit to audibly convey instructions, menu choices, information, etc., to the user via the telephone connection.

The problem with these interfaces is a user must often listen to the lengthy messages before pressing telephone buttons to make selections. Over time, many uses of a particular automated telephone service frustrate users by having to listen to the familiar menu messages in order to accomplish navigation to a well known point in the telephone service. Should a user have a good memory of which telephone buttons to press without listening to an entire menu message, time may be saved through immediate pressing of the keys to proceed to the next menu. Not all systems are capable of accepting a premature DTMF in order to advance to the next menu selection. In any case, a user is faced with wasting valuable time interfacing to a system which may be interfaced with more efficiently.

Many telephone service menus do not allow queuing up of DTMFs in order to expedite menu navigation. Queuing up of DTMFs may only be permitted within a small window of time. If a telephone service is able to immediately queue up back to back entered DTMF entries for menu navigation, there is still the human problem of remembering which keys to enter for advancing to a desired point in the menu. As telephone services provide more features, menus become larger and a menu tree of a particular automated telephone service may contain many ascending or descending nodes to a navigation point in the menu tree.

Automated telephone services are becoming commonplace and used wherever possible. A method is needed for relieving a user from interfacing to an automated telephone service when the service menus are well known by the user.

SUMMARY OF THE INVENTION

Briefly stated, the present invention is directed to a system and method for automatically interfacing a telephone user to an automated telephone service. The system allows a user to record interfacing to an automated telephone service and save the recording for later recall. The recording can be saved to personal local storage or to a shared storage area for use by a plurality of users. The system allows a user to invoke the saved recording of interface activity at any time so that the automated telephone service is interfaced to in an automatic manner. Providing such a system through saving of keystrokes, for example macros, has problems which prevent proper operability. This invention extends a macro-like concept through saving additional interface data and coordinating that data with a particular automated service.

The system monitors for the press of telephone buttons (such as DTMF signals). The system determines whether a telephone button has been pressed or a command prefix button has been entered. If a telephone button has been pressed and a record mode is set to ON, the system saves the telephone button along with associated information into a pending macro buffer. 'Recording' and 'macro' are used interchangeably in this specification. Typically, a user actually interfaces to an automated service for creating a recorded macro. After saving that recorded macro, the macro can be used at any future time for automatic navigation within the same automated service. A macro is recorded by saving a button type that is determined by the duration of the telephone button pressed, the button, and the time since press of the previous entry. The two types of buttons that allow interfacing to an automated service are immediate and wait.

If a command prefix button has been entered, the system will execute the command. Commands include saving a macro to a local library; invoking a macro by button or by voice; browsing a macro library; and deleting a macro. When the desired macro is recorded, the user can save the macro with a desired invocable sequence, that can be implemented in voice or with buttons, in a local library.

The present invention is installed as server code on a processor or a PBX switch. The present invention includes a local library of personal macros, accessible to a specific user, as well as a shared library of macros, accessible to telephone users who use the same automated services.

The present invention implements an automated timing methodology for issuing DTMFs to an automated service. This timing methodology allows a user to interface to an automated service in an optimal manner by supporting queued up buttons as well as prompted-for buttons.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the digit(s) to the left of the two rightmost digits in the corresponding reference number.

BRIEF DESCRIPTION OF TH FIGURES

The present invention will be described with reference to the accompanying drawings, wherein:

FIGS. 7A through 7G depict flow diagrams representing the server process of the present invention.

DETAILED DESCRIPTION OF THE PREFERRED EMBODIMENTS

Overview of the Invention

Figure 1:
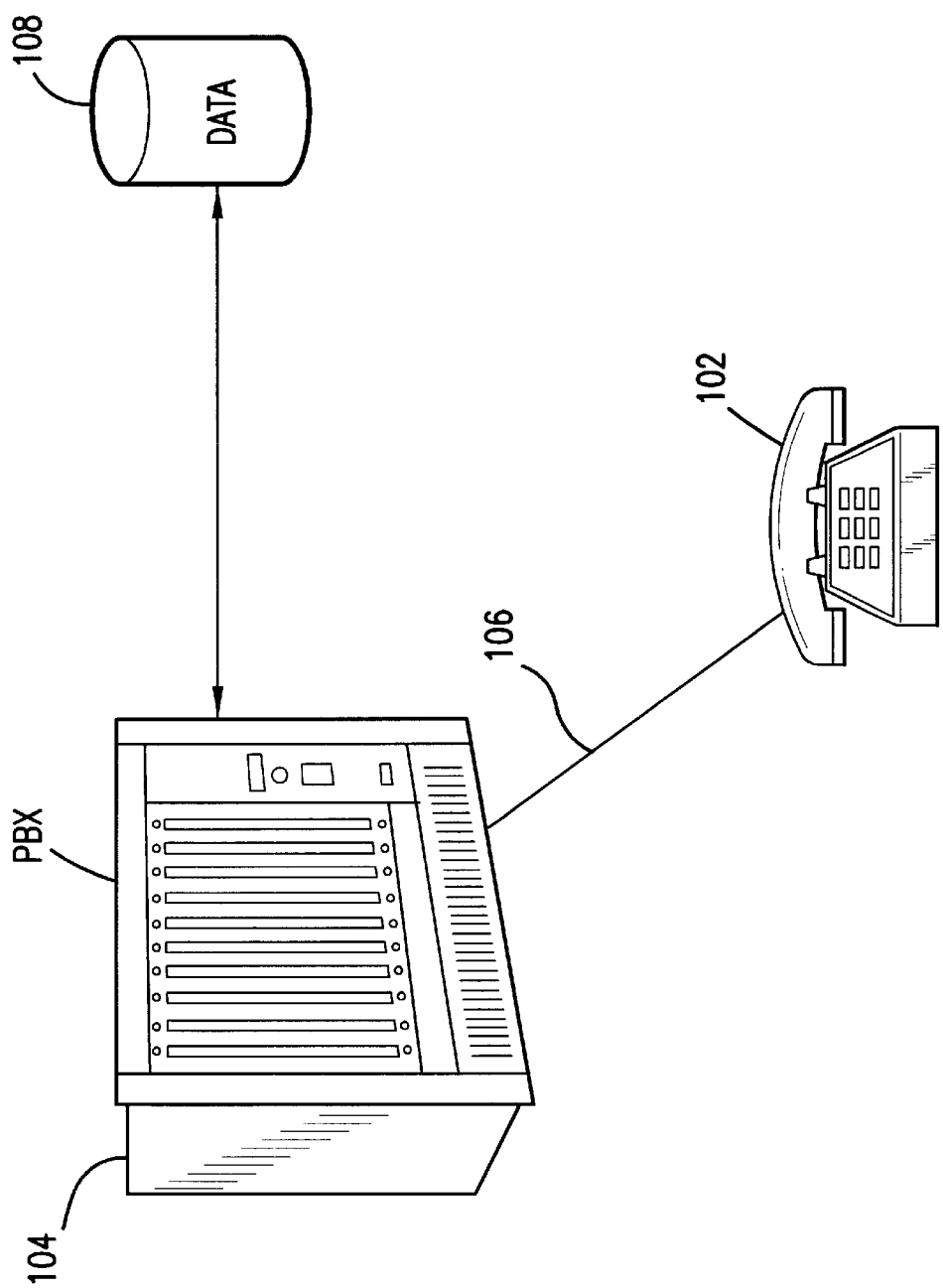
FIG. 1 illustrates a PBX embodiment of the present invention.

The present invention is a method and system for enabling a telephone user to automatically interface to an automated service with DTMF macros. The present invention provides keystroke recording and playing. Time between automated service menu items and the duration of outgoing messages for those items may differ for any two calls to an automated service. The present invention provides a solution for timing inconsistencies by implementing an automated timing methodology for issuing DTMFs to the connected automated service. The present invention provides each user with a local library as well as a shared library of macros. The local library allows personal macros to be defined and is accessible to a specific user. The shared library is accessible to many telephone users within a network and allows the sharing of macros between telephone users utilizing the same automated services. A macro is retrieved from the local library first. If it is not found in the local library, then the shared library is searched. Each library is defined to facilitate managing macros in an efficient and user friendly manner through use of the telephone. Macros are referenced through button assignments or voice command assignments. Voice commands are converted to the equivalent strings for comparison in order to facilitate multiple users to a shared library of macros.

The present invention manages DTMF macros to an arbitrary telephony service interface. A user may enter a DTMF record mode upon interfacing to an automated telephone service. Buttons pressed along with time information between pressing of buttons is saved. Two types of DTMF buttons may be specified and saved by the user. A button of type IMMEDIATE will be issued to the service without regard for prompting. A button of type WAIT will be issued to the service only after a moment of silence is detected. The two types of buttons allow interfacing to an automated service in an optimal manner by supporting queued up buttons as well as prompted-for buttons. Button distinction is determined by the duration of the pressed DTMF. When the desired macro is captured, the user enters a save mode and the telephone macro is saved to a desired invocable sequence. The invocation may be achieved with a special telephone button sequence or a voice command. The telephone user has the ability to also define descriptions to be associated with the macros as voice recordings or human readable text strings (converted from voice). The text strings may be visually browsed at a computer. The user also has the ability to alter the strings at a personal computer, in which case subsequent telephone browses of the macros will produce an annotated voice output from the textual description. While times between DTMFs of type WAIT are preserved, input is coordinated to the automated service by listening for pauses at appropriate moments and then issuing the next DTMF sequence. If an automated service is not yet in a prompt mode, time expansion is performed after an elapsed time period to ensure coordinated timing of recorded DTMFs. Subsequent calls having varying outgoing message times will not affect automatic entering of DTMFs. Completion of the macro produces a distinguishable audible which indicates completion to the user. The user may then continue a manual interface therefrom to the automated service.

The present invention also allows many macros to be issued by a user during any single telephone session. For example, multiple stock trades may be accomplished by repeating the following scenario: (1) a first macro to dial the telephone number and navigate to the desired point in the automated trading service menu; (2) a manually entered stock symbol; (3) a second macro to complete the trade; (4) a third macro to navigate back to a navigation path where step 2 can be performed again, etc.

An embodiment of the present invention is shown in FIG. 1. The system comprises a Private Branch Exchange (PBX) switch or server 104 connected to at least one telephone 102 via a telephone link 106 and a database 108. The PBX switch 104 provides for the transmission of calls to and from a public telephone network (not shown). All processing occurs at the PBX switch 104. The present invention is installed as server code on the PBX switch 104. The database 108 contains local and shared libraries of macros. The database 108 may or may not be local to the PBX switch 104. The database can be maintained on a stand alone storage unit or memory device, such as a floppy disk drive, a magnetic tape drive, a compact disk drive, etc. or on a storage unit or memory device within a local area network (LAN). The instant the telephone 102 goes off hook, the user has availability to the service.

Figure 2:
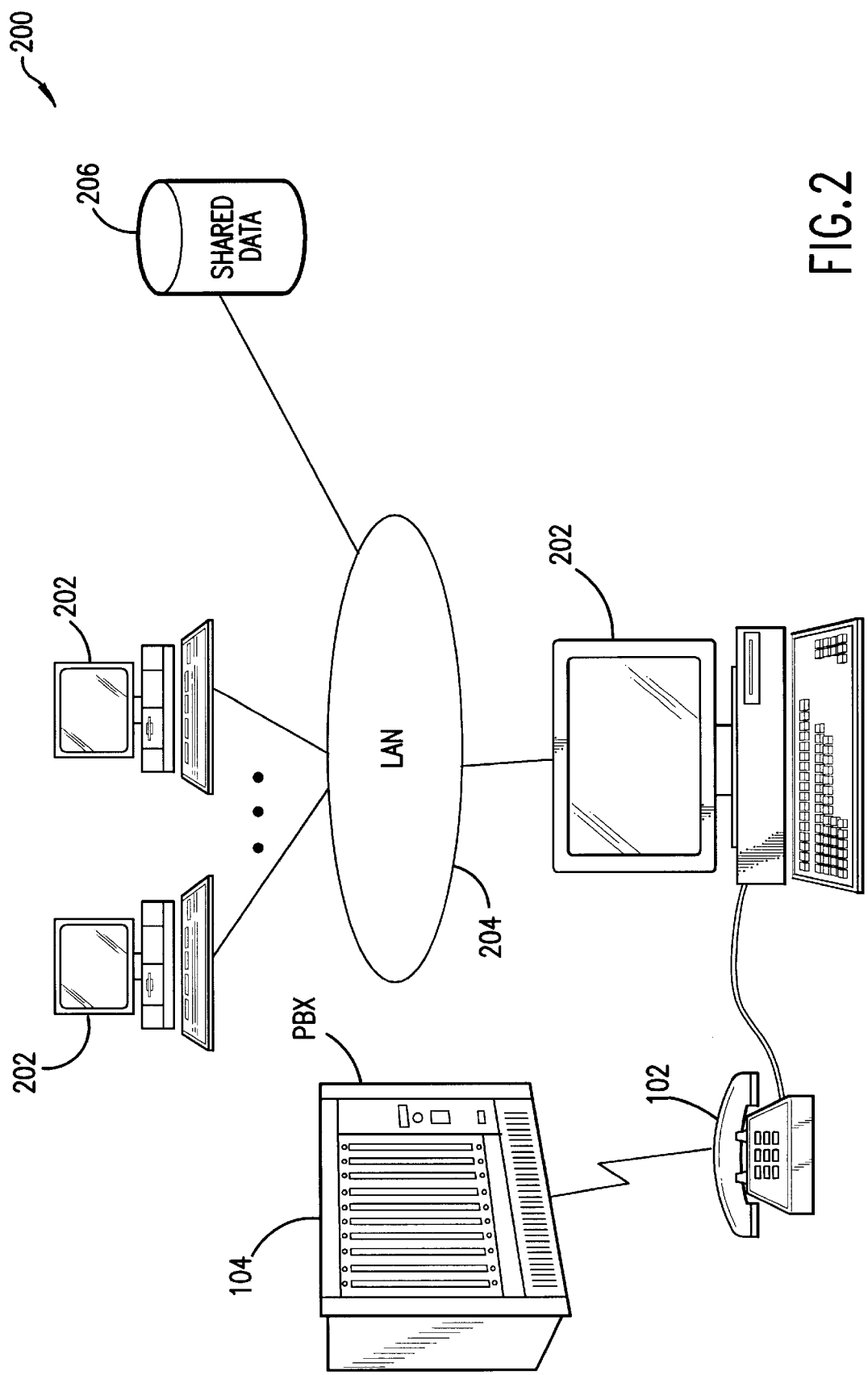
FIG. 2 illustrates a PC attached telephone embodiment of the present invention.

Additional embodiments of the present invention utilize PCs (personal computers). FIG. 2 represents a PC connected embodiment comprising a PC 202 serially connected to a telephone 102, such as a ROLM 244 PC configuration. All processing occurs on the PC 202. The PC 202 may have a connection to a LAN 204. The present invention is installed as server code on the PC 202. The PC 202 interfaces to a shared repository 206 on the LAN 204 for shared library macros. In a preferred embodiment, local library macros are stored on the memory or storage device of the PC 202. If the PC 202 is a LAN server, the shared library macros may be referenced on the memory or storage device of that PC 202.

Figure 3:
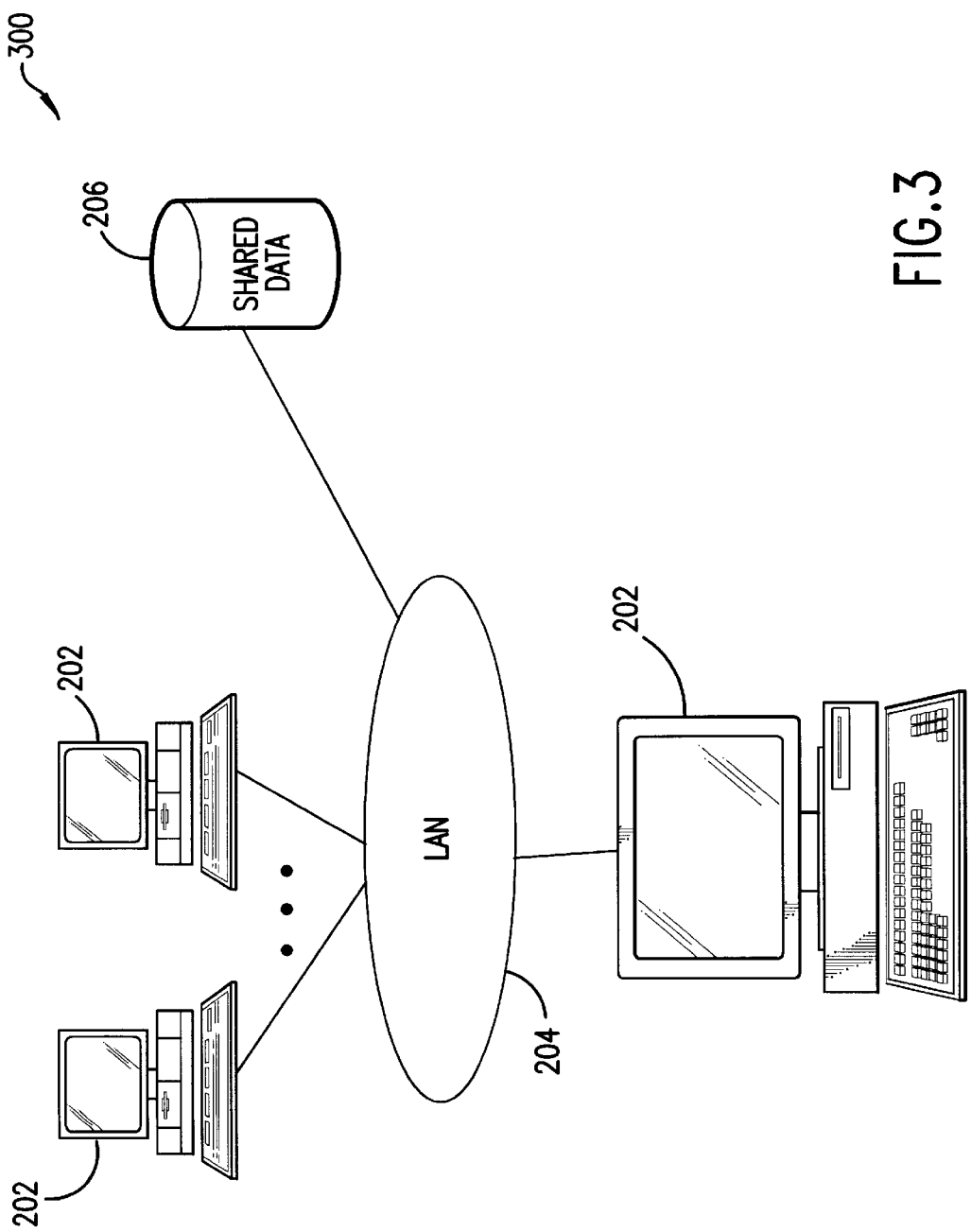
FIG. 3 illustrates another PC embodiment of the present invention.

Another PC embodiment of the present invention is shown in FIG. 3. The system contains a PC 202 connected to a LAN 204. The PC 202 contains an interface card that provides telephone capabilities. Such a configuration allows calls to be placed to, and received from PC 202. The microphone and speaker(s) of PC 202 (not shown) are used in place of the equivalent telephone parts. Again, all processing occurs on the PC 202 and the present invention is installed as server code on the PC 202. The PC 202 interfaces to a shared repository 206 on the LAN 204 for shared library macros. In a preferred embodiment, local library macros are stored on the memory or storage device of the PC 202. If the PC 202 is a LAN server, the shared library macros may be referenced on the memory or storage device of that PC 202.

Another embodiment of the present invention is within a wireless Smart Phone. All processing occurs on the wireless Smart Phone. No shared library is incorporated in such an embodiment. Appropriate information for the wireless Smart Phone embodiment is disclosed in the copending application entitled "Wireless Smart Phone," application Ser. No. 08/673,812 filed Jun. 27, 1996 (Atty. Docket No. RIC-96-010; 1575.0860000) referred to above.

Implementation of the Invention

Figure 4:
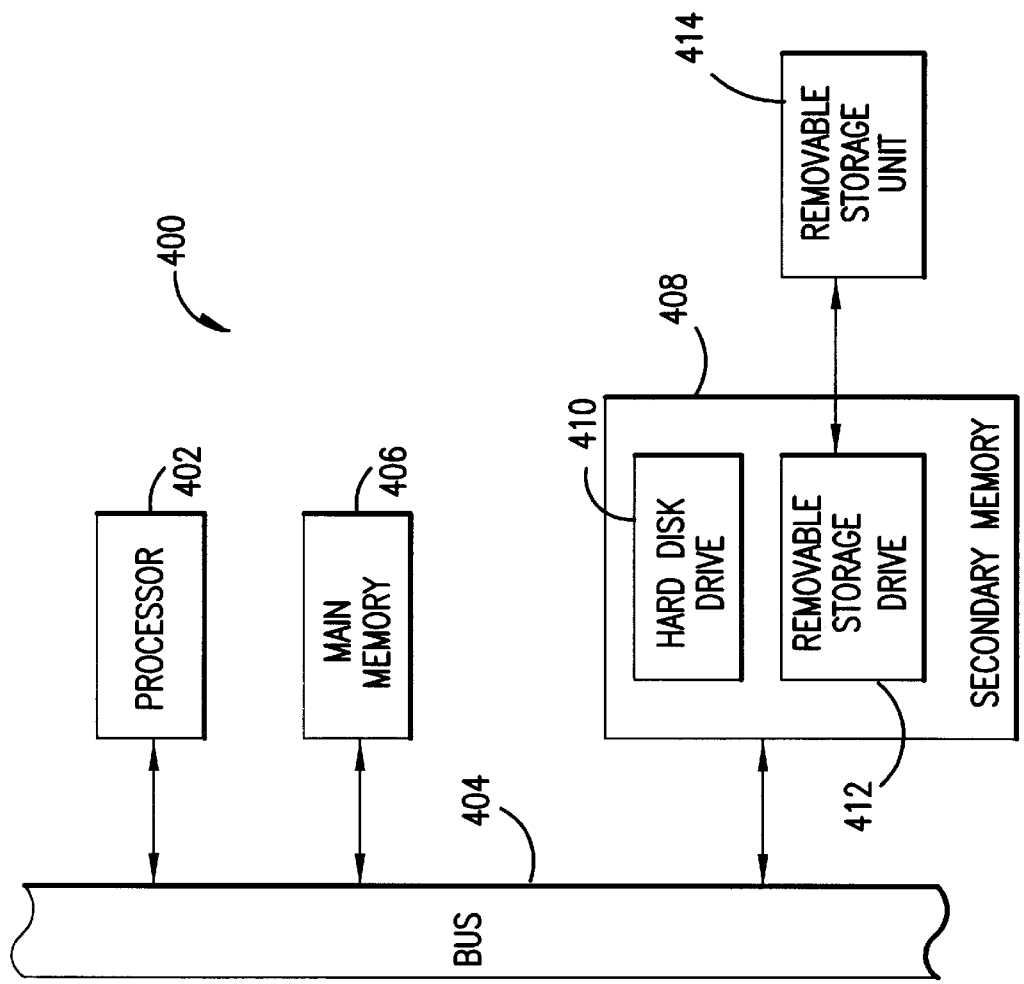
FIG. 4 illustrates a block diagram of an exemplary computer system useful for implementing components of the present invention.

The combination of the PBX 104 and the database 108 can be implemented, at least partially, using a computer system, such as the computer system 400 shown in FIG. 4. This computer system 400 can also be used to implement at least portions of the PC 202 in the PC embodiments of the present invention.

The computer system 400 includes one or more processors, such as processor 402. The processor 402 is connected to a communication bus 404.

The computer system 400 also includes a main memory 406, preferably random access memory (RAM), and a secondary memory 408. The secondary memory 408 includes, for example, a hard disk drive 410 and/or a removable storage drive 412, representing a floppy disk drive, a magnetic tape drive, a compact disk drive, etc. The removable storage drive 412 reads from and/or writes to a removable storage unit 414 in a well known manner.

Removable storage unit 414, also called a program storage device or a computer program product, represents a floppy disk, magnetic tape, compact disk, etc. The removable storage unit 414 includes a computer usable storage medium having stored therein computer software and/or data.

Computer programs (also called computer control logic) are stored in main memory and/or the secondary memory 408. Such computer programs, when executed, enable the computer system 400 to perform the features of the present invention as discussed herein. In particular, the computer programs, when executed, enable the processor 402 to perform the features of the present invention. Accordingly, such computer programs represent controllers of the computer system 400.

In another embodiment, the invention is directed to a computer program product comprising a computer readable medium having control logic (computer software) stored therein. The control logic, when executed by the processor 402, causes the processor 402 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant art.

Local and shared libraries of macros are maintained on one or more of the memory or storage devices discussed in FIGS. 1–3 and shown in FIG. 4 (406 and 408). The local and shared libraries can be maintained, for example, as macro tables of entries that include the following fields: MACRO; INVOKE-TYPE; INVOCATION; DESCRIPTION-TYPE; and DESCRIPTION. An exemplary macro table entry is illustrated in Table 1.

TABLE 1

| MACRO | Button Type (Immediate or Wait) | Button | Time Since Press of Previous Entry | ••• | Button Type (Immediate or Wait) | Button | Time Since Press of Previous Entry |
| --- | --- | --- | --- | --- | --- | --- | --- |
| INVOKE-TYPE | Voice Command or Button | | | | | | |
| INVOCATION | Text String or Button | | | | | | |
| DESCRIPTION-TYPE | Text String or Voice Recording | | | | | | |
| DESCRIPTION | Text String from a PC interface or a file reference to a voice recording description of the macro | | | | | | |

The MACRO field is an ordered list of three field records, each record referred to as a MACRO record. The first field in a MACRO record is the button type. The button type can be immediate or wait. The two button types allow for interfacing to automated services in an optimal manner by supporting queued up buttons as well as prompted-for buttons. For a button type of immediate, the DTMF tones corresponding to the telephone buttons in the macro sequence are issued to the service immediately, one after the other, without regard for service prompting when playing the macro. For a button type of wait, the DTMF tones corresponding to the telephone buttons are issued with a predetermined time delay between DTMF tones, once the signal level of the automated service indicates it is ready for the next key. This process is described in more detail below with respect to FIG. 7B. The selection of immediate button type or wait button type is preferably done through the duration of the key press of a predetermined key. In one embodiment, the meaning of a key as a function of the duration of the key press is disclosed in copending application entitled "System and Method for Transmitting Data and Commands Using a Telephone," application Ser. No. 08/672,186, filed on Jun. 27, 1996 (Atty. Docket No. RIC-96-009; 1575.0840000) referred to above. Of course, there may be alternate methods to associate two meanings to a button according to duration. The second field in a MACRO record is the telephone button which was pressed. The third field in a MACRO record is the time since press of the previous MACRO record entry. If this is the first MACRO record in the MACRO field, then the third field is zero.

The INVOKE-TYPE field indicates whether the macro will be invoked by a voice command or a button command.

The INVOCATION field indicates the actual button used to invoke the macro if it has an invoke type of button or a text string that corresponds to the voice command used to invoke the macro.

The DESCRIPTION-TYPE field defines the field type for the DESCRIPTION field; string or voice recording. The final field type, DESCRIPTION, is either a text string from a PC interface or a file reference to a voice recording description.

Figure 5:
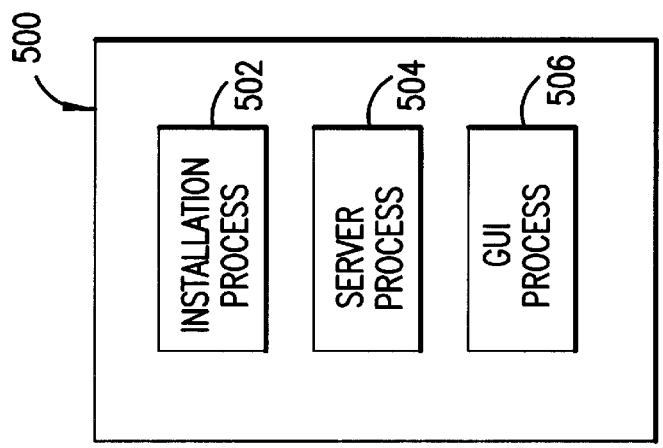
FIG. 5 illustrates a diagram representing the processes of the present invention.

The present invention is presented in FIG. 5 as comprising three processes: an installation process 502, a server process 504, and a graphical user interface (GUI) process 506. The installation process 502 installs the local and shared databases as well as the server process 504. The server process 504 allows a user to perform functions such as record a macro, save a macro, invoke a macro, browse macros, and delete a macro. The GUI process 506 is a system administration process that allows a system administrator or an authorized user to move locally tested macros from a local library to the shared library for use by the entire network of users. The GUI process 506 can also be used to install local macros in local libraries. The installation process 502 and server process 504 applies to all embodiments heretofore discussed with the exception of the wireless Smart Phone. The GUI process 506 must be embodied on a computer, such as FIG. 4 further including display means and peripheral input means.

The Installation Process

Figure 6:
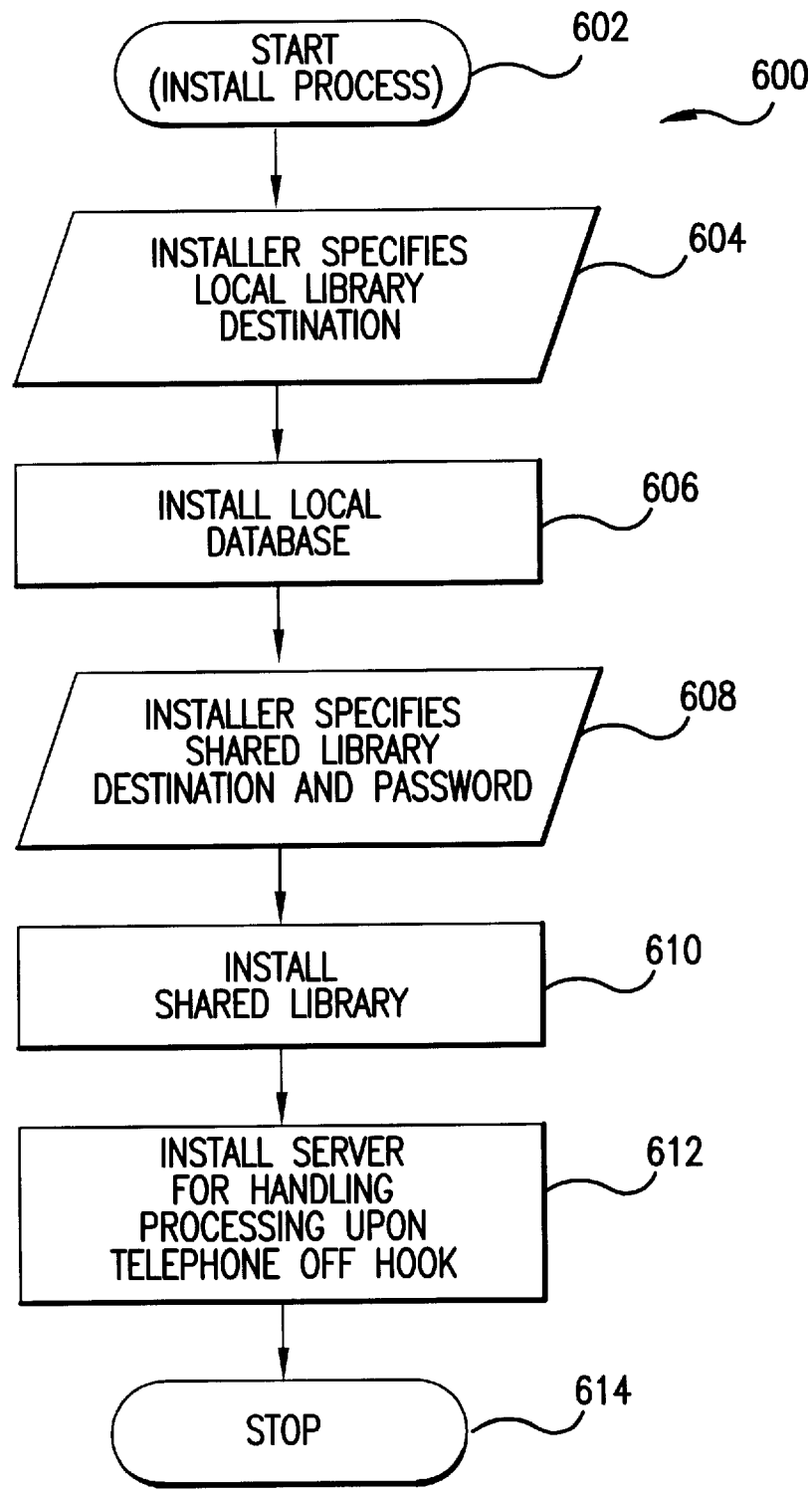
FIG. 6 depicts a flow diagram representing the install process of the present invention.

The installation process 502 is represented by the flow diagram 600 of FIG. 6. The installation process 502 includes installation for both local and shared environments. The installation process begins in step 602. In input step 604, the installer is prompted to specify a local library destination. In the PC embodiments (200 and 300) shown above, one must specify a drive and/or directory on the PC 202. In the PBX environment 100, one must specify a memory or storage device that is accessible to the PBX switch 104. In step 606, the local database is installed on the memory or storage device specified in step 604.

In input step 608, the installer is prompted to specify a shared library destination and a password for access to that shared library. The password ensures that only authorized persons with knowledge of the password can modify and maintain the shared library. In step 610, the shared library is installed on a memory or storage device that was specified in step 608. Typically, the shared library is created in a manner allowing many users to access it, for example, in a network.

The server process 504 (server code or computer program product code) for handling processing upon a telephone 102 going off-hook is installed in step 612. The server code allows the event of the telephone 102 going off-hook to close a loop between the user and the PBX switch in order to deliver a dial tone to the telephone 102. The occurrence of the phone going off-hook allows the server to monitor activity on that line, such as the pressing of buttons. In the PC environment, when the phone goes off-hook, there is a signal transmitted to the PC. The installation process 600 ends in step 614 upon completion of the installation of the server code.

The Server Process

Figure 7A:
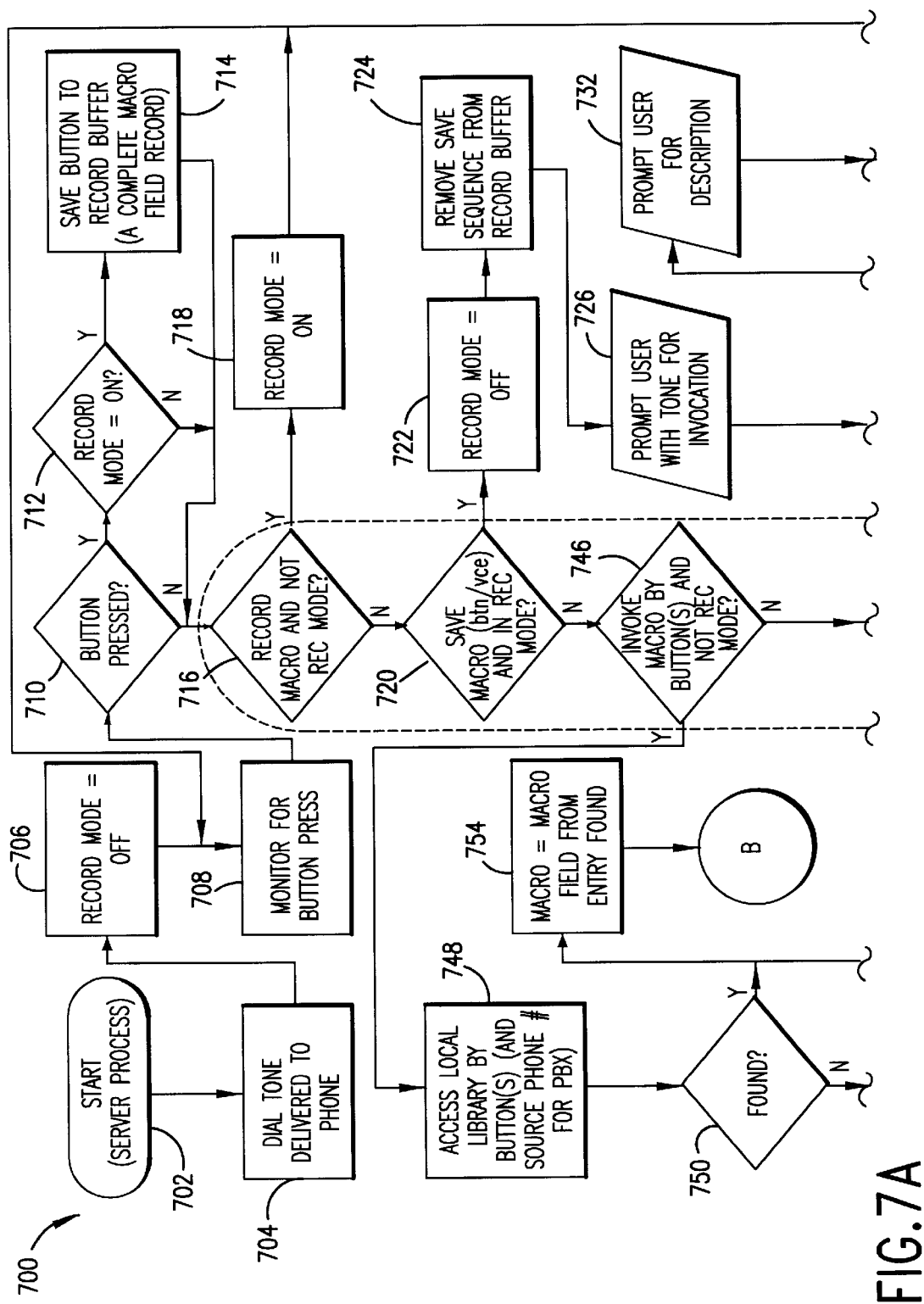
Figure 7B:
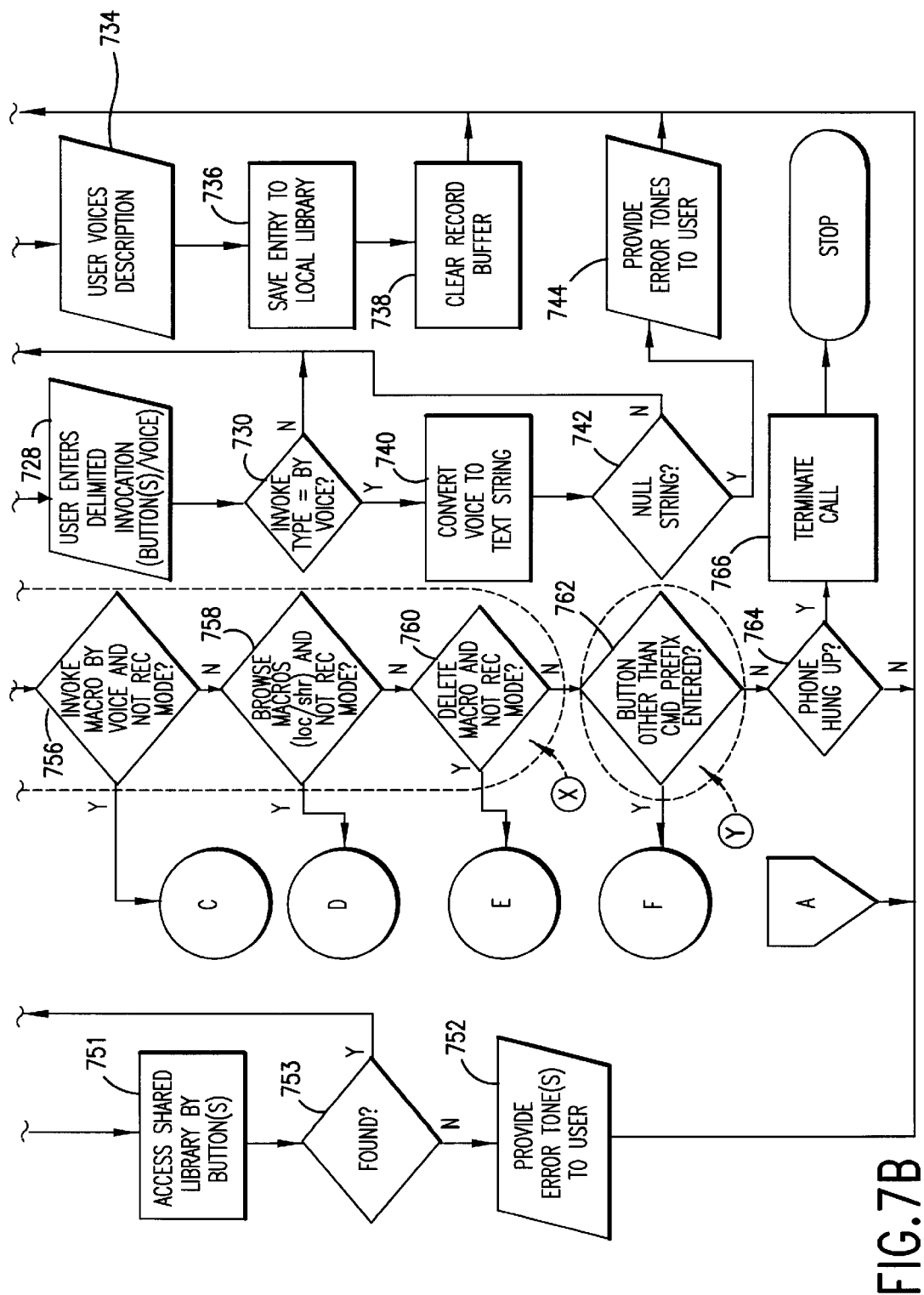

FIGS. 7A–7G represent the flow diagrams for the server process 504. FIGS. 7A and 7B illustrate the primary flow diagram 700 used to store and execute user-defined sequences of keystrokes or macros. The macros of the present invention can be used to access a service or to traverse menus, such as in an automatic response unit. The server process 504 starts in step 702. The server process 504 is invoked when the telephone 102 goes off-hook. In step 704, the dial tone is delivered to the telephone 102 or PC 202 with an internal interface card representing a telephone device. In step 706, a macro record mode variable is set to off indicating that no macro is currently being recorded. In step 708, buttons pressed are monitored. In a decision step 710, it is determined whether any monitored button has been pressed by the user. If a monitored button has been pressed by the user, then processing continues to a decision step 712. In decision step 712, it is determined whether the macro record mode variable is set to on, thereby determining whether a macro is currently being recorded. If a macro is currently being recorded, as determined in decision step 712, then processing continues at step 714. In step 714, the button pressed by the user is appropriately saved to a record buffer. The record buffer (also called a macro buffer) stores MACRO records in the MACRO field shown above in Table 1. A MACRO record is a three field record, the button type, the actual button pressed, and the time since the press of the previous MACRO record. It is here, in step 714, that the button type, immediate or wait, is determined. The duration is passed from step 708 to step 714. Processing then continues at a decision step 716. Returning to step 712, if a macro is not currently being recorded, then processing also continues at decision step 716. Returning to step 710, if a monitored button was not pressed (e.g., telephone connection terminated by hanging up), then step 710 also continues at step 716. Thus, step 708 flows to step 710 for buttons pressed and telephone on-hook status. Step 714 traps telephone device user activity to a macro for subsequent use ("macro recording").

Steps 716, 720, 746, 756, 758, 760, 762, and 764 determine the meaning of user input. In the preferred embodiment, a command sequence is identified by a command prefix followed by a unique button. for example, the asterisk button '*' followed by the one button '1' indicates the command to turn the record mode on. Thus, the asterisk '*' can be a command prefix for identifying all commands (* 1, *2, *3, etc.). A prefix may also be formed by multiple buttons to prevent interfering with menus. One embodiment may define special command buttons on an extended keypad for commands. Yet another embodiment may use button press durations to distinguish between commands.

In the preferred embodiment of a button command prefix (e.g., *), the prefix is queued up for recognition of commands at steps 716, 720, 746, 756, 758, and 760. Obvious queuing of a prefix is assumed in FIG. 7A so focus remains on primary processing.

In decision step 716, it is determined whether the user has selected to record a macro. In decision step 716, it is also determined whether or not the macro record mode is active. If the user has selected to record a macro, and the telephone device is not currently in the macro record mode, then the macro record mode is turned on in step 718 by setting the record mode variable to ON. Processing then returns to button press monitoring step 708. Note that trapping only occurs if the macro record mode is set to ON.

Returning to decision step 716, if the user has not selected to record a macro, then in decision step 720 it is determined whether the user has selected to save a macro. In decision step 720, it is also determined whether or not the macro record mode is active thereby denoting that a macro was indeed in progress of being saved. It should be noted that in decision steps 746, 756, 758, and 760, it is ensured that for each selected function, the telephone device is not in the macro record mode. In the preferred embodiment, the functions indicated by steps 746, 756, 758, and 760 cannot be performed if the telephone device is in the macro record mode. In an alternate embodiment, the telephone device of the present invention would provide an error tone if the user selected one of the foregoing functions while the telephone device was in the macro record mode.

Returning to decision step 720, if it is determined that the user selected to save the macro, then macro record mode is turned off in step 722. The record buffer, referred to in step 714 above, now contains the particular telephone buttons and associated information of the macro sequence, as well as the telephone buttons corresponding to the save command sequence. In step 724, the save command sequence information is removed from the record buffer. This ensures that the save sequence does not get saved as part of the macro. In step 726, the user is prompted with a tone to indicate that the invocation must be set. In step 728, the user enters the particular invocation to be used. The invocation can be a button, or buttons to invoke the macro. Alternatively, the invocation can be a special button or button sequence indicating to use a voice command. If a voice command is used as the invocation, then delimiters are used to turn the recorder on and off during recording of the voice invocation. In decision step 730, it is determined whether the invocation type will be by voice (e.g., user entered '#'). If the invocation is not by voice (e.g., user entered '5'), then processing continues at step 732 where the user is prompted for a description of the macro. In step 734, the user specifies a description of the macro. In a PBX embodiment, the user will provide a voice description. When the user provides a voice description, the user must provide delimiters, as described above, to turn the recorder on and off. Alternatively, in a PC embodiment, the user has the option of keying in the description by hand. In step 736, the entry is then saved to one or more of the storage or memory devices of the telephone device, i.e., in a local library. In step 738, the record buffer is cleared, and processing continues at button press monitoring step 708. Step 736 will overwrite a local library entry if the invocation type and reference matches an existing entry. Therefore, the macro referenced by the voiced string "health benefits" refers to only one macro. Likewise, the macro referenced by the command sequence *35 refers to only one macro referenced by the button 5 (*3 is command sequence for invocation by button (s)).

Returning to decision step 730, if the invocation type is by voice, then the invocation voice is converted to a text string in step 740. Computer program logic or software is commercially available for converting voice into text strings. Such software includes "DragonDictate" offered by Dragon Systems, Inc. Another commercially available speech-to-text conversion package is "Voice Type Dictation System" offered by IBM. Step 740 allows user specified delimiters to turn voice record on and off. In decision step 742, it is determined whether the text string is empty, or is a null string (i.e., nothing recorded). If the text string is a null string, then an error tone is provided to the user in step 744. Processing then continues at button press monitoring step 708. Returning to decision step 742, if the text string is not a null string (i.e., something was recorded), then processing continues at step 732, described above. The sequence of steps selected by decision step 720 as described above allows a macro to be saved for future reference by a convenient recall method, command sequence, or voice command.

If, in step 720, it is determined that the user did not elect to save a macro, then step 746 is performed. In decision step 746, the user can select to invoke a macro. In decision step 746, it is determined if the user selected to invoke a macro by buttons. If invoking a macro by buttons was selected then in step 748, the local library (button invocable macros) is accessed by the specified command sequence buttons. In decision step 750, it is determined whether the macro specified by the user is found. If the macro is found, then in step 754 a macro variable is set to the macro field in the entry found. Processing then continues to FIG. 7C, described below, by way of flowchart connector B.

Returning to decision step 750, if the specified macro is not found in the local library, then the shared library of macros are accessed in step 751. In decision step 753, it is determined whether the macro specified by the user is found in the shared library. If the macro is found, then in step 754, the macro variable is set to the macro field in the entry found. Processing then proceeds to FIG. 7B, described below, by way of flowchart connector B. Returning to decision step 753, if the selected macro is not found in the shared library, then an error tone is provided to the user in step 752. Processing then returns to button press monitoring step 708. Thus, the shared library is searched upon not finding an entry in the local library. This allows override of shared library macros with local library macros.

Returning to step 746, if the user did not elect to invoke a macro, then step 756 is performed. It is determined in a decision step 756 whether the user selected to invoke a macro by voice. If the user selects this option, then processing continues to FIG. 7D, described below, by way of flowchart connector C. If in step 756 the user did not invoke a macro by voice, then step 758 is performed. It is determined in decision step 758 whether the user selected a browse macro function. If the user selected the browse macro function, processing continues to FIG. 7E, described below, by way of flowchart connector D. If the user in step 758 did not elect the browse macro function, then step 760 is performed. It is determined in decision step 760 whether the user selected to delete a macro. If the macro delete function was selected by the user, processing continues to FIG. 7F, described below, by way of flowchart connector E. Otherwise, step 760 proceeds to step 762.

As discussed previously, the processes accessed by decision steps 716, 720, 746, 756, 758, and 760 (identified as X in FIGS. 7A and 7B) are used to capture telephone buttons that are entered subsequent to a predetermined command prefix. If a button other than a command prefix is entered as determined by step 762, (also shown as Y in FIG. 7B) then processing continues to FIG. 7F, described below, by way of flowchart connector F. Otherwise, step 762 proceeds to step 764. Note that a command sequence would prevent encounter of step 762.

Finally, it is determined in a decision step 764 whether the call is terminated. If the call was terminated (e.g., phone hung up) by the user then step 766 terminates the call and terminates server processing. Any in progress state is also terminated. For example, hanging up in the middle of recording a macro will flush the record buffer and quit processing. If the phone has not been hung up by the user, then processing continues from step 764 to monitor for a button press by the user in step 708.

Figure 7C:
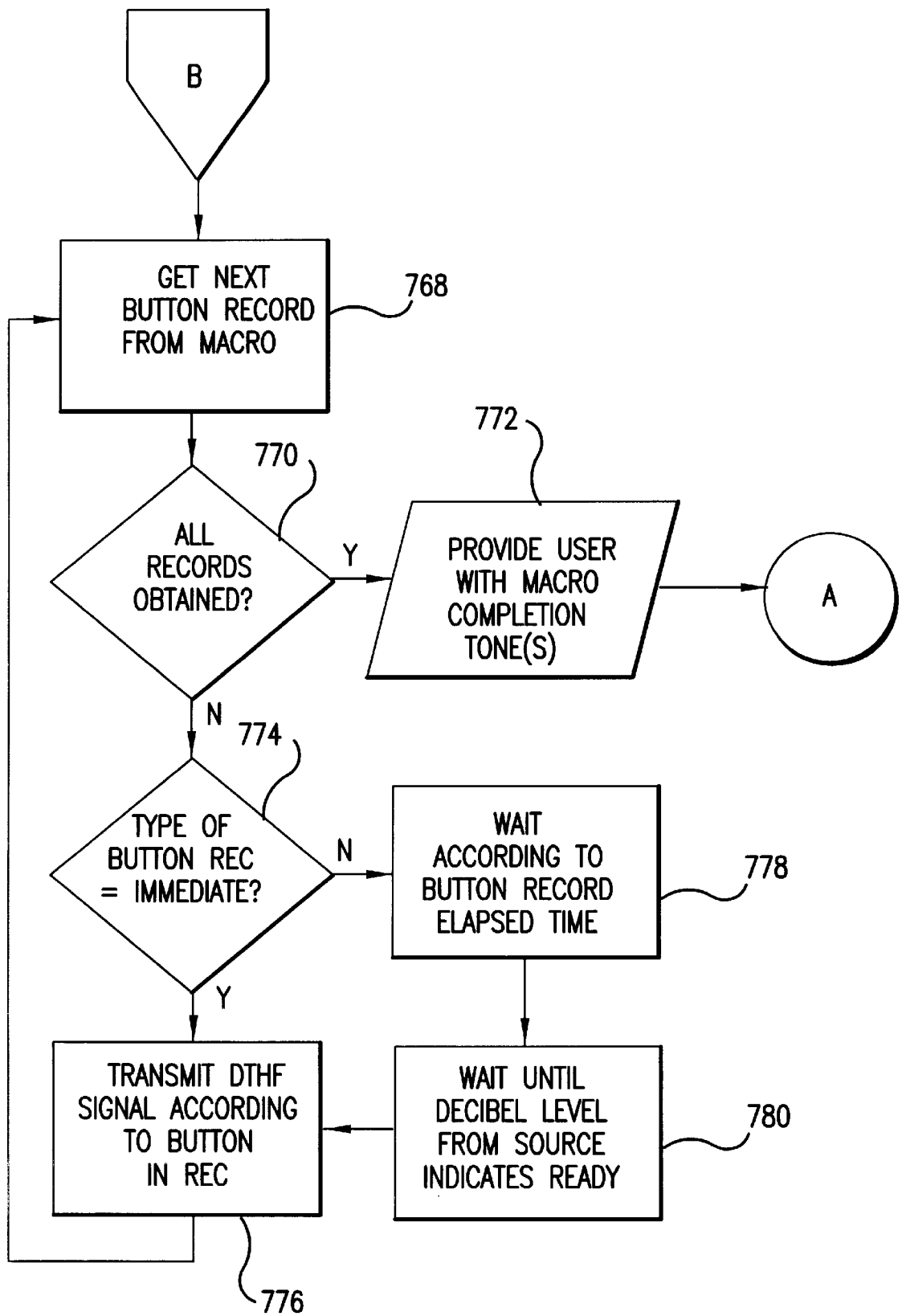

A flow diagram for executing a macro is depicted in FIG. 7C. In step 768, the next button record is retrieved from the macro variable. First encounter of step 768, from step 754, retrieves the first MACRO record in the MACRO variable. In decision step 770, it is determined whether all macro records have been obtained. If all records have been obtained, then the user is provided with a macro completion tone in step 772. Processing then returns to the button monitoring step 708 in FIG. 7A by way of flowchart connector A. The tone provided in step 772 indicates completion of macro processing. This allows a user to be doing other things or to multi-task while waiting for the automatic navigation to the selected point in a service menu. The user simply waits for the audible alert.

Returning to decision step 770, if all records have not been obtained, processing continues to decision step 774. In decision step 774, it is determined if the button type is immediate. If the button type is immediate, then the DTMF signal that corresponds to the button in the record will be transmitted in step 776. Processing will then continue at step 768 to get the next button record from the macro variable.

Returning to decision step 774, if the button type is not immediate (i.e., the button type is wait) then the process of isochronous expansion occurs. The isochronous expansion begins by waiting in step 778 according to the elapsed time saved in the button record. For a button type of wait, a predetermined or preprogrammed amount of time elapses between sending of DTMF signals that correspond to the telephone buttons in the macro sequence. Once the predetermined time has elapsed, then processing continues at step 780 to wait until the decibel or signal level of a received signal (analog or digital) indicates that the service is ready to receive the next DTMF signal in the macro sequence. Once that signal or decibel level has dropped below a threshold (x decibels), then the DTMF signal that corresponds to the button in the record is transmitted in step 776. The next button from the macro record is then obtained in step 768.

A macro may be composed as a mixture of immediate and wait buttons. The decibel threshold used by step 780 is preferably configurable by a user.

Figure 7D:
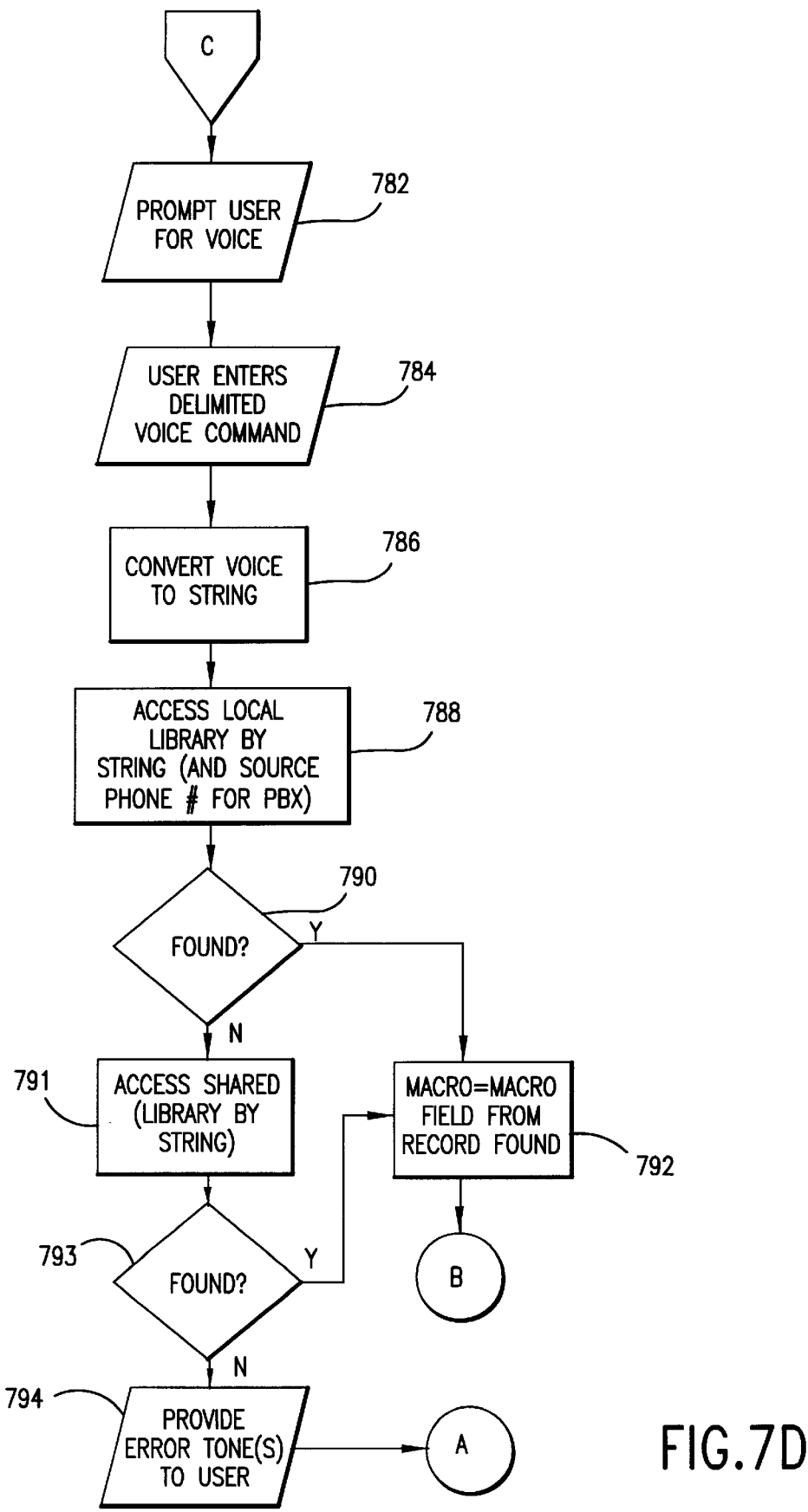

A flow diagram for invoking a macro by voice is illustrated in FIG. 7D. In step 782, the user is prompted for the voice command to invoke the macro. In step 784, the user enters the delimited voice command. In step 786, the voice is then converted to a text string, in a manner described above. The local library (voice invoked macros) is then accessed in step 788 to find the string identified in step 786. If the macro for the voice string is found, as determined in decision step 790, then in step 792, the macro variable is set to the macro field from the library entry found. The macro is then executed by the flowchart in FIG. 7C, described above, by way of flowchart connector B. Returning to decision step 790, if the matching macro is not found, the shared library is then accessed in step 791 to find the voice text string identified in step 786. If the text string is found, as determined in decision step 793, control proceeds to step 792 and processing continues as described above. Returning to step 793, if the voice text string is not found, then an error tone is provided to the user in step 794. Processing then continues back to step 708 of FIG. 7A by way of flowchart connector A.

Figure 7E:
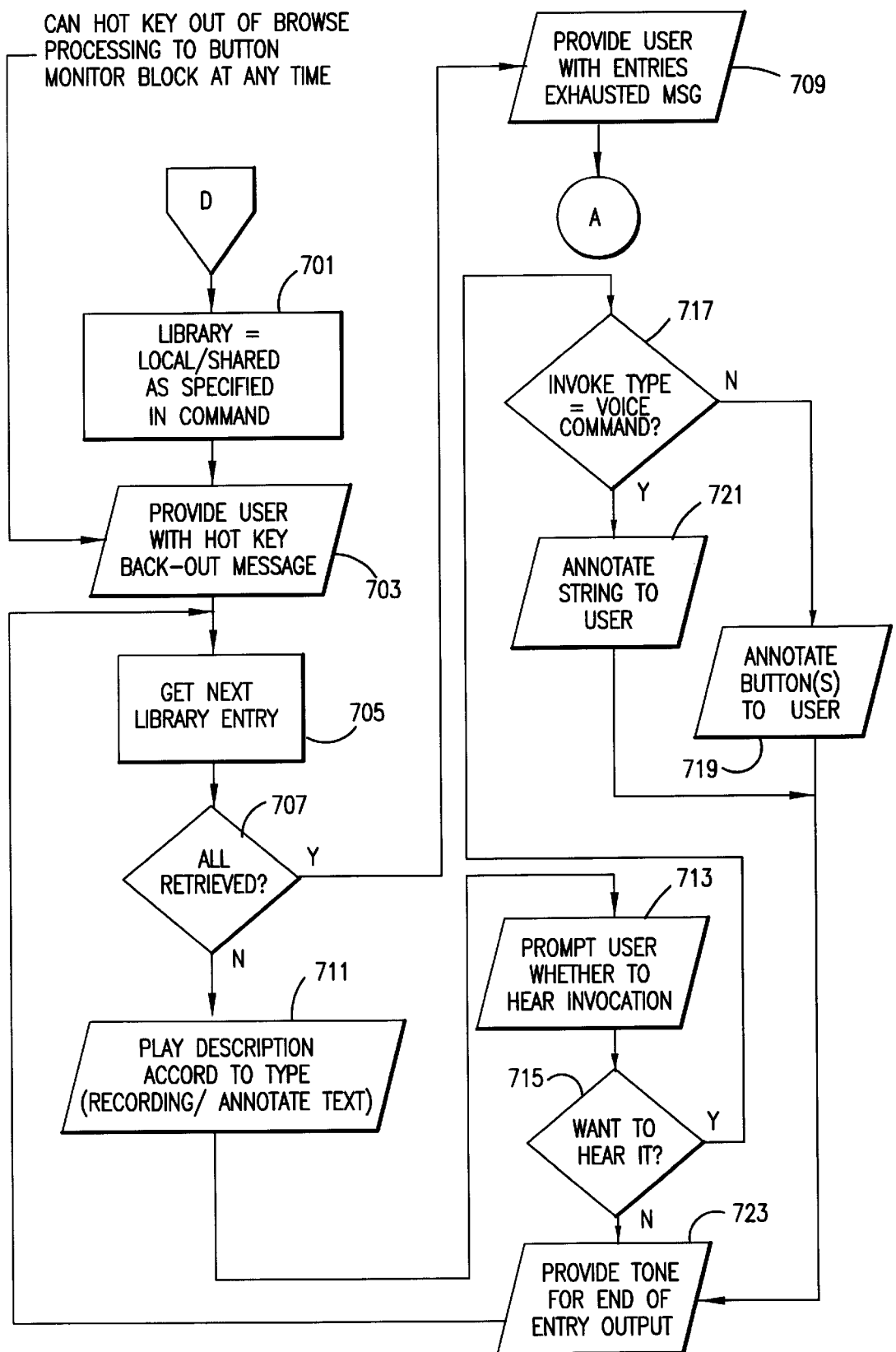

FIG. 7E illustrates a flow diagram for browsing macros. In step 701, a library variable is set to local or shared, as specified by the command determined at step 758 of FIG. 7B. In step 703, the user is provided with a message that explains how to hot-key out of the browse macro function. In the embodiment shown in FIG. 7E, the user can exit the browse macro function by pressing the identified hot key during browse at any time. In step 705, the next entry in the macro library is retrieved. First encounter of step 705 from step 703 retrieves the first library entry. Either the local library or shared library is browsed according to the LIBRARY variable set at step 701. If all macro library entries have been retrieved as determined in decision step 707, then the user is provided with an entries exhausted message in step 709. Processing then returns to FIGS. 7A and 7B by way of flowchart connector A.

Returning to decision step 707, if all macro library entries have not been retrieved, then the description is played of the retrieved macro library entry in step 711. Step 711 plays the recording or annotates the text string. The user is then prompted in step 713 for whether the user wants to hear the invocation for this macro library entry. If the user does want to hear the invocation, as determined in decision step 715, then processing continues to decision step 717. In decision step 717, it is determined whether the invocation type is a voice command. If the invocation type is not a voice command, indicating that it is a button invocation, then the button (or buttons) is annotated to the user in step 719. A tone is then provided to the user to indicate the end of the entry output in step 723. Processing then continues to step 705 to get the next macro library entry.

Returning to decision step 717, if the invocation type is a voice command, then the string is annotated to the user in step 721. The tone indicating the end of entry output is then provided to the user in step 723, and processing returns to step 705.

Returning to step 715, if the user opted to not hear the invocation sequence, then step 715 proceeds to step 723 for tone output, and processing returns to step 705.

FIG. 7F illustrates a flow diagram for deleting a macro. In step 725, the user is prompted with a tone for the invocation. Deleting a macro by its voice command, or by its button reference, is determined by the type of delete command captured by step 760 of FIG. 7A. In step 727, the user enters the invocation according to the delete command determined at step 760. In step 727, the user speaks the voice command for a voice command macro or otherwise enters the button reference. In step 729, an attempt to retrieve the entry is made from the local macro library of the present invention. Step 729 is carried out in accordance with the type of invocation for the macro sequence. For example, if the macro is a voice command macro, then the voice string from step 727 is searched in step 729 to find the particular macro. Step 727 converts the voice to a text string in preparation of the search. In decision step 731, it is determined whether the macro has been found. If the macro has not been found, then an error tone is provided to the user in step 733. Processing then returns to the button monitor step 708 in FIG. 7A by way of flowchart connector A.

Returning to decision step 731, if the macro is found, then it is deleted in step 735. A successful tone is provided to the user in step 737. Processing then continues to step 708 in FIG. 7A by way of flowchart connector A.

FIG. 7G illustrates a flow diagram for transmitting DTMF signals for appropriate buttons, for example dialing digits on menu option selections of an automated service. In step 739, transmission of the DTMF signal corresponding to the button that has been entered is transmitted. Processing then continues to step 708 in FIG. 7A by way of flowchart connector A.

The Graphical User Interface (GUI) Process

Figure 8A:
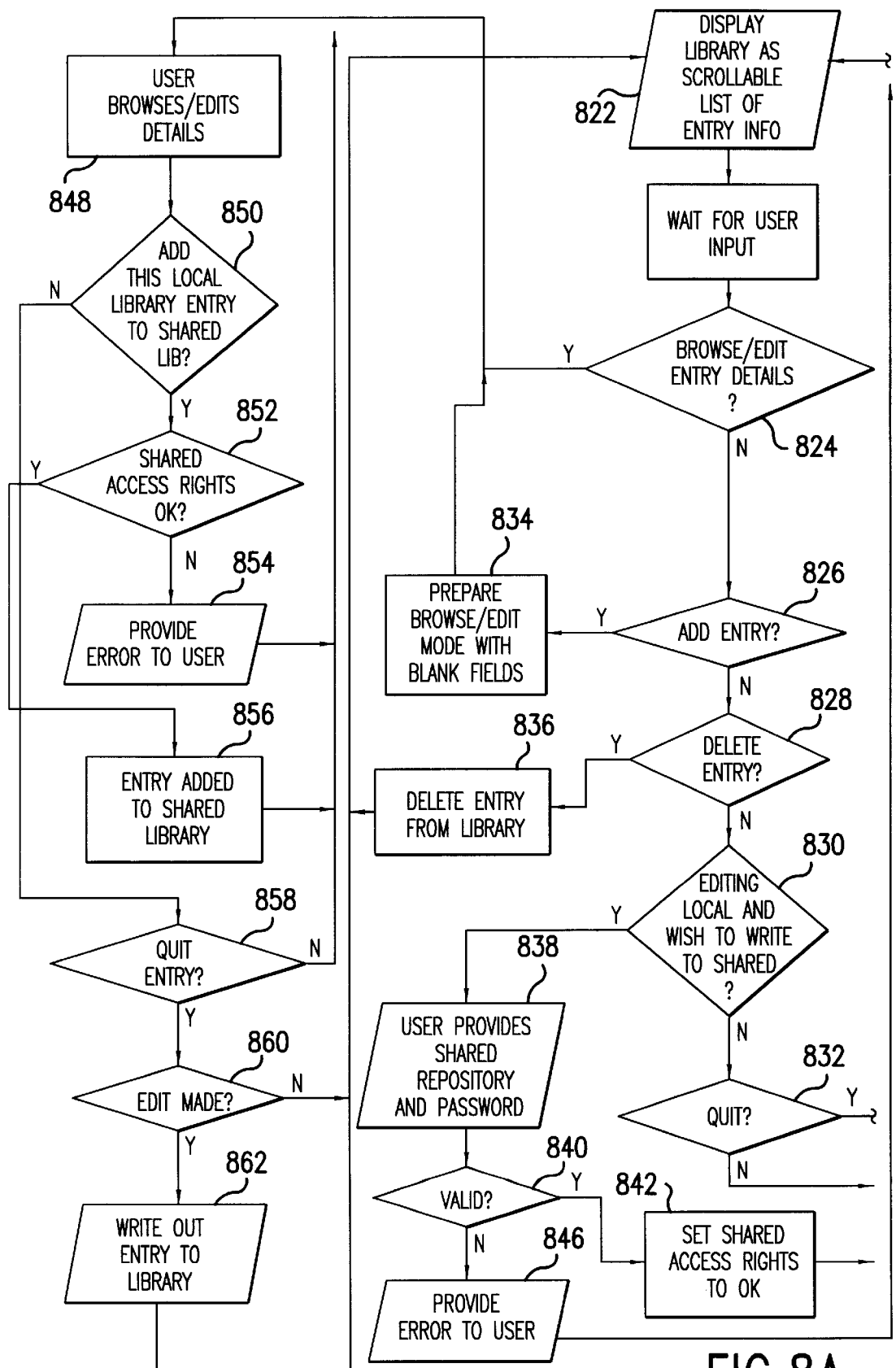
FIGS. 8A and 8B depict a flow diagram representing the graphical user interface (GUI) process for allowing an authorized user to move locally tested macros to the shared library.
Figure 8B:
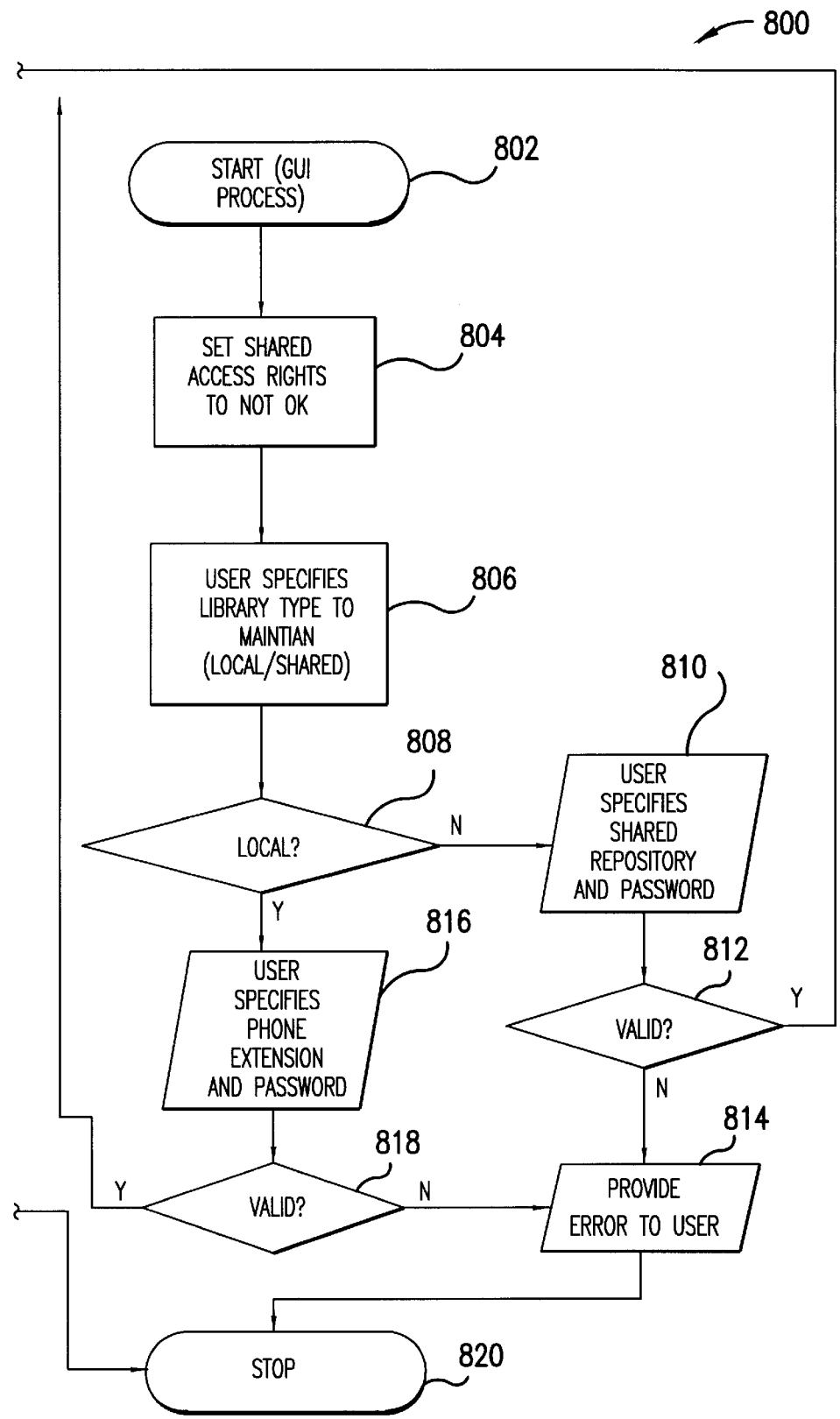

Operation of the graphical user interface (GUI) process 506 is shown in a flowchart 800 in FIGS. 8A and 8B. The GUI process 506 may be used by a user to maintain his local library entries with a GUI on a computer. The GUI process 506 is also an administrative process that allows an administrator to maintain the shared library of macros, as well as move locally tested macros from a particular local library to the shared library for use by a network of users. For example, many companies that offer medical benefits, 401K plans, stock plans, etc. have an automated service to allow employees to obtain information concerning these benefit services. In order to facilitate using the automated services, the system administrator may move tested macros from a local library into a shared library to allow employees to automatically interface with these automated services.

A regular user may use this GUI process 506 to update the user's local macros, but a regular user will be unable to work with any shared macros unless the user knows the shared library password.

The GUI process 506 starts in step 802. The GUI process 506 is invoked by entering a command from a command line, double clicking on a menu option with a mouse in a GUI window, or the like.

In step 804, a shared access rights variable is initialized to prevent the user from currently having access to the shared repository of macros. In step 806, the user specifies the library type that he will be working with: shared or local. If in decision step 808 the specified library is shared, control is passed to step 810. In step 810, the user is prompted to specify the shared repository and the associated password for that shared repository. The shared repository could be represented by a drive/directory/filename, such as z:\dir\frame in a DOS environment. In another embodiment, the shared repository could be represented as a database. In decision step 812, it is determined whether the shared repository and password are valid. If the shared repository and password are valid, control is passed to the main menu at step 822. If the shared repository and password are not valid, control is passed to step 814 where the user is provided with an error message, and the process terminates in step 820.

Referring back to decision step 808, if the library type is local, the user is prompted to enter his telephone extension and password in input step 816. This authentication process prevents a user from editing another user's library of macros. In an alternative embodiment, the user could be required to enter his/her employee number, social security number, or some other unique identification number. If the user's phone extension and password are valid (decision step 818), control is passed to the main menu at step 822. If the phone extension and password are not valid, the user is provided with an error message in step 814 and the process terminates in step 820.

In step 822, a scrollable list of entries for the local or shared library is presented along with options determined at decision steps 824, 826, 828, 830, and 832. The GUI process 800 waits for the user to perform an action. The five actions that the user can perform are (1) Browse/Edit entry details, determined at decision step 824; (2) Add entry, determined at decision step 826; (3) Delete entry, determined at decision step 828; (4) Wish to write to shared, determined at decision step 830; and (5) Quit, determined at decision step 832.

If the user selects to Browse/Edit entry details of a selected library entry in the scrollable list, as determined by step 824, control passes to step 848 where a detailed window for the selected entry can be used to edit or browse the entry. If the user selects to Add an entry as determined at step 826, blank fields are entered in a defaulted detailed window for adding a library entry in step 834, and control is passed to step 848 where the defaulted detailed window can be used to edit the entry.

If the user selects to Delete a selected entry as determined at step 828, the selected entry is deleted from the library in step 836, and the main window is refreshed by re-displaying the main window in step 822. If the user wishes to write to the shared library during his session with the GUI process 506, the user must select the wish to write to shared function as determined at step 830. Upon selection of wanting to write to shared (determined in step 830), the user is prompted to enter the shared repository and password in step 838. Step 830 assures the user is currently working with a local library before granting the option. In decision step 840, the provided shared repository and password are validated. If the provided shared repository and password are valid, the shared access rights variable is set to allow the user access to the shared library in step 842, and processing continues back to step 822. If the provided shared repository and password are not valid, an error message is displayed in step 846, and processing continues back to step 822. If the user selects to Quit the GUI process 506, as determined in step 832, the GUI process 506 terminates windows and terminates in step 820.

Returning to step 848, the user is allowed to browse and/or edit details of the selected library entry. The details presented in the detailed window of step 848 are the fields shown above in Table 1. The User browses/edits details in a main detailed window, and a child window for browsing/editing the MACRO field (a scrollable list of MACRO records). In decision step 850, if the user wishes to add this local library entry to the shared library, it must be determined whether the user has shared access rights in step 852 (rights were gained via steps 830, 838, 840, and 842). If the user does not have shared access rights, an error message is displayed to the user in step 854, and control is transferred back to step 848. If the user has shared access rights, the entry is added to the shared library in step 856, and control is transferred back to step 848. A shared library entry with the same invocation type and invocation reference will be overwritten with the matching local library entry.

Returning to decision step 850, if the user does not wish to add the local library entry to the shared library, the user may quit the entry in decision step 858. If the user wishes to quit the entry, it is determined whether an edit was made to the entry in step 860. If an edit was made, the entry is written to the library in step 862, and control is passed back to step 822 where the main window is refreshed and re-displayed. If an edit was not made, control passes immediately back to step 822. In decision step 858, if the user does not wish to quit the entry, control is passed back to step 848.

All of the above validation decision steps, 812, 818, and 840, requires that the validation information be maintained, or be made accessible to the GUI process 506.

Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of interfacing a telephone user to an automated telephone service, comprising the steps of:
  (1) monitoring for the press of a telephone button used to navigate within said automated service;
  (2) determining whether said telephone button has been pressed;

(3) determining whether a command has been entered, if said telephone button has not been pressed;

(4) recording a macro used to navigate within said automated service, if said telephone button has been pressed and a record mode is set to ON, comprising the step of:

saving said telephone button in a record buffer while said record mode is set to ON, said record buffer comprising a button type determined by the duration of said telephone button pressed, wherein said button type includes one of immediate and wait; and (5) executing said command, if said telephone button has not been pressed and a command prefix has been entered.

2. The method of claim 1, wherein said telephone button is representative of a dual tone multiple frequency (DTMF) signal.

3. The method of claim 1, wherein step (5) comprises one or more of the steps of:

executing a save macro command;

executing an invoke macro by button command;

executing an invoke macro by voice command;

executing a browse macro library command; and executing a delete macro command.

4. The method of claim 3, wherein said step of executing a save macro command comprises the steps of:

(a) entering an invocation to invoke said macro and, if said invocation is entered by voice, converting the voice to a text string;

(b) entering a description of said macro; and (c) saving said macro to a library.

5. The method of claim 3, wherein said step of executing an invoke macro by button command comprises the steps of:

(a) accessing a local library for said macro and, if not found, accessing a shared library for said macro;

(b) getting a button record from said macro, wherein said button record comprises:

a button type determined by the duration of said telephone button pressed, wherein said button type includes one of immediate and wait;

said telephone button; and a time since press of previous entry;

(c) performing an isochronous expansion process, if all button records are not obtained and said button type is wait;

(d) transmitting a DTMF signal according to said telephone button in said button record, if all said button records are not obtained; and (d) returning to step (b).

6. The method of claim 5 wherein step (c) comprises the steps of:

waiting for said time since press of last entry, found in said button record, to expire; and waiting until a decibel level of a received analog signal indicates that said automated service is ready.

7. The method of claim 3, wherein said step of executing an invoke macro by voice command comprises the steps of:

(a) prompting a user for a delimited voice command;

(b) converting said delimited voice command to a string;

(c) accessing a local library for said macro and, if not found, accessing a shared library for said macro;

(d) getting a button record from said macro, wherein said button record comprises:

a button type determined by the duration of said telephone button pressed, wherein said button type includes one of immediate and wait;

said telephone button; and a time since press of previous entry;

(e) performing an isochronous expansion process, if all button records are not obtained and said button type is wait;

(f) transmitting a DTMF signal according to said telephone button in said button record, if all said button records are not obtained; and (g) returning to step (d).

8. The method of claim 7, wherein step (e) comprises the steps of:

waiting for said time since press of last entry, found in said button record, to expire; and waiting until a decibel level of a received analog signal indicates that said automated service is ready.

9. The method of claim 3, wherein said step of executing a browse macro library command comprises the steps of:

(a) retrieving a library entry from one of said local and said shared libraries;

(b) playing a description of the retrieved library entry;

(c) allowing a user to hear the invocation associated with said macro by annotating string to user, if said invocation is voice, and annotating button(s) to user, if said invocation is button(s); and (d) returning to step (a).

10. The method of claim 1, further comprising the step of:

(6) transmitting a DTMF signal according to said telephone button, if a macro is not being recorded and said commands are not executing.

11. The method of claim 1, wherein said record buffer further comprises:

a time since press of a previous entry.

12. A system for interfacing a telephone user to an automated telephone service, comprising:

means for monitoring for the press of a telephone button used to navigate within said automated service;

means for determining whether said telephone button has been pressed;

means for determining whether a command has been entered, if said telephone button has not been pressed;

means for recording a macro used to navigate within said automated service, if said telephone button has been pressed and a record mode is set to ON, comprising:

means for saving said telephone button in a record buffer while said record mode is set to ON, said record buffer comprising a button type determined by the duration of said telephone button pressed, wherein said button type includes one of immediate and wait; and means for executing said command, if said telephone button has not been pressed and a command prefix has been entered.

13. The system of claim 12, wherein said telephone button is representative of a dual tone multiple frequency (DTMF) signal.

14. The method of claim 12, wherein said execution means includes:

means for executing a save macro command;

means for executing an invoke macro by button command;

means for executing an invoke macro by voice command;

means for executing a browse macro library command; and means for executing a delete macro command.

15. The system of claim 14, wherein said means for executing a save macro command comprises:

means for entering an invocation to invoke said macro and, if said invocation is entered by voice, converting the voice to a text string;

means for entering a description of said macro; and means for saving said macro to a library.

16. The system of claim 14, wherein said means for executing an invoke macro by button command comprises:

means for accessing a local library for said macro and, if not found, means for accessing a shared library for said macro;

means for getting a button record from said macro, wherein said button record comprises:
a button type determined by the duration of said telephone button pressed, wherein said button type includes one of immediate and wait;
said telephone button; and
a time since press of previous entry;

means for performing an isochronous expansion process, if all button records are not obtained and said button type is wait; and means for transmitting a DTMF signal according to said telephone button in said button record, if all said button records are not obtained.

17. The system of claim 16, wherein said means for performing an isochronous expansion process comprises:

means for waiting for said time since press of last entry, found in said button record, to expire; and means for waiting until a decibel level of a received analog signal indicates that said automated service is ready.

18. The system of claim 14, wherein said means for executing an invoke macro by voice command comprises:

means for prompting a user for a delimited voice command;

means for converting said delimited voice command to a string;

means for accessing a local library for said macro and, if not found, means for accessing a shared library for said macro;

means for getting a button record from said macro, wherein said button record comprises:
a button type determined by the duration of said telephone button pressed, wherein said button type includes one of immediate and wait;
said telephone button; and
a time since press of previous entry;

means for performing an isochronous expansion process, if all button records are not obtained and said button type is wait; and means for transmitting a DTMF signal according to said telephone button in said button record, if all said button records are not obtained.

19. The system of claim 18, wherein said means for performing an isochronous expansion process comprises:

means for waiting for said time since press of last entry, found in said button record, to expire; and means for waiting until a decibel level of a received analog signal indicates that said automated service is ready.

20. The system of claim 14, wherein said means for executing a browse macro library command comprises:

means for retrieving a library entry from one of said local and said shared libraries;

means for playing a description of the retrieved library entry; and means for allowing user to hear the invocation associated with said macro by annotating string to user, if said invocation is voice, and annotating button(s) to user, if said invocation is button(s).

21. The system of claim 12, further comprising:

transmission means for transmitting a DTMF signal according to said telephone button, if a macro is not being recorded and said commands are not executing.

22. The system of claim 12, wherein said record buffer further comprises:

a time since press of a previous entry.

23. A computer program product comprising a computer useable medium having computer program logic recorded thereon for enabling a processor in a computer system to interface a telephone user to an automated telephone service, said computer program logic comprising:

means to enable said processor to monitor for the press of a telephone button used to navigate within said automated service;

means to enable said processor to determine whether said telephone button has been pressed;

means to enable said processor to determine whether a command has been entered, if said telephone button has not been pressed;

means to enable said processor to record a macro used to navigate within said automated service, if said telephone button has been pressed and a record mode is set to ON, comprising:
means to enable said processor to save said telephone button in a record buffer while said record mode is set to ON, said record buffer comprising a button type determined by the duration of said telephone button pressed, wherein said button type includes one of immediate and wait;

means to enable said processor to execute said command, if said telephone button has not been pressed and a command prefix has been entered; and means to enable said processor to transmit a DTMF signal according to said telephone button, if a macro is not being recorded and said commands are not executing.

24. The computer program product of claim 23, wherein said execution means comprises:

means for enabling said processor to execute a save macro command;

means for enabling said processor to execute an invoke macro by button command;

means for enabling said processor to execute an invoke macro by voice command;

means for enabling said processor to execute a browse macro library command; and means for enabling said processor to execute a delete macro command.

25. The computer program of claim 23, wherein said record buffer further comprises:

a time since press of a previous entry.

26. An apparatus to interface a telephone user to an automated telephone service, comprising:

a server, said server containing server code to record, save, invoke, browse, and delete a macro, wherein said macro is used to interface said telephone user to said automated telephone service;

at least one telephone, serially connected to said server via a telephone link, for transmitting said macro to said automated telephone service;

a local database, connected to said server, containing a local library of macros for allowing said telephone user to save, invoke, browse, and delete said macro; and a shared database, connected to said server, containing a shared library of macros for allowing said telephone user to invoke and browse said macro.

27. The system of claim 26, wherein said server comprises a private branch exchange switch.

28. The system of claim 26, wherein said server comprises a personal computer (PC), wherein said PC includes a storage medium for housing said local library of macros and interfaces to a local area network (LAN) via a telecommunication medium, said LAN comprising a shared repository for housing said shared library of macros.

29. The system of claim 27, wherein said telephone comprises a circuit card providing telephone capabilities.

30. A method of interfacing a telephone user to an automated telephone service, comprising the steps of:

(1) monitoring for the press of a telephone button used to navigate within said automated service;

(2) determining whether said telephone button has been pressed;

(3) determining whether a command has been entered, if said telephone button has not been pressed;

(4) recording a user-defined macro used to navigate within said automated service to a shared storage area accessible by a plurality of users, if said telephone button has been pressed and a record mode is set to ON; and (5) executing said command, if said telephone button has not been pressed and a command prefix has been entered.

* * * * *